United States Patent
Frick

(10) Patent No.: US 6,873,277 B1
(45) Date of Patent: Mar. 29, 2005

(54) MULTI-PHASE MEASUREMENT SYSTEM WITH SYNCHRONIZED SIGMA DELTA CONVERTERS

(75) Inventor: Roger L. Frick, Minneapolis, MN (US)

(73) Assignee: Rosemount, Inc., Eden Prairie, MN (US)

( * ) Notice: Subject to any disclaimer, the term of this patent is extended or adjusted under 35 U.S.C. 154(b) by 31 days.

(21) Appl. No.: 10/665,672

(22) Filed: Sep. 19, 2003

(51) Int. Cl.[7] .............................. H03M 3/00; G01L 9/12
(52) U.S. Cl. ........................................ 341/143; 73/718
(58) Field of Search .......................... 341/143; 73/724, 73/718; 324/680, 678, 658; 340/870.23, 511

(56) References Cited

U.S. PATENT DOCUMENTS

| | | | |
|---|---|---|---|
| 4,791,352 A | * 12/1988 | Frick et al. | 340/870.23 |
| 5,083,091 A | 1/1992 | Frick et al. | 324/678 |
| 5,637,802 A | 6/1997 | Frick et al. | 73/724 |
| 5,705,978 A | 1/1998 | Frick et al. | 340/511 |
| 6,089,097 A | 7/2000 | Frick et al. | 73/718 |
| 6,140,952 A | 10/2000 | Gaboury | 341/143 |
| 6,295,875 B1 | 10/2001 | Frick et al. | 73/718 |
| 6,509,746 B1 | 1/2003 | Wang | 324/678 |
| 6,516,672 B2 | 2/2003 | Wang | 73/718 |
| 6,684,711 B2 * | 2/2004 | Wang | 73/724 |
| 6,720,777 B2 * | 4/2004 | Wang | 324/680 |

* cited by examiner

*Primary Examiner*—Patrick Wamsley
(74) *Attorney, Agent, or Firm*—Kinney & Lange, P.A.

(57) ABSTRACT

A measurement system includes multiple analog sensor elements and multiple sigma-delta modulators for producing digital outputs. Each sigma-delta modulator receives charge packets from one or more sensor element and charge packets from a shared element (which may be a sensor or a reference element). The sigma-delta modulators are operated synchronously in separate phases, so that the shared element either delivers or does not deliver a charge packet of the sign desired by a sigma-delta modulator only during the phase associated with that sigma-delta modulator.

34 Claims, 2 Drawing Sheets

MULTI-PHASE MEASUREMENT SYSTEM WITH SYNCHRONIZED SIGMA DELTA CONVERTERS

CROSS-REFERENCE TO RELATED APPLICATION(S)

None.

BACKGROUND OF THE INVENTION

The present invention relates to a measurement system. In particular, the present invention relates to a measurement circuit having multiple sensor elements and multiple sigma-delta modulators for converting analog measurements by the sensor elements to digital outputs.

A field transmitter is a device that is used to monitor the operation of an industrial process. The field transmitter includes a transducer that responds to a measured process variable with a sensing element and converts the variable to a standardized transmission signal that is a function of the measured variable. The term "process variable" refers to a physical or chemical state of matter or conversion of energy. Examples of process variables include pressure, temperature, flow, conductivity, and pH.

One such transmitter is described in U.S. Pat. No. 6,295,875 by Roger L. Frick and David A. Broden entitled "PRESSURE SENSOR FOR A PRESSURE TRANSMITTER". This transmitter employs a capacitive sensor having a deflectable sensing diaphragm and three or more capacitor electrodes which form separate capacitive sensing elements with the diaphragm. Two of the capacitor elements are primary sensing capacitors that are arranged differentially so that the capacitances of the primary sensing capacitors charge oppositely in proportion to the process variable. The third and fourth capacitor elements are compensation capacitors that provide signals representing offset errors or hysteresis associated with the primary capacitors. As pressure is applied to one or both sides of the diaphragm, the diaphragm deflects. The deflection of the diaphragm can be detected by measuring a change in a ratio of electrical capacitance related to the deflection. This capacitance ratio is converted into a digital format using an analog-to-digital converter.

Another type of transmitter is described in U.S. Pat. No. 5,637,802 by Roger L. Frick, Bennett L. Louwagie and Adrian C. Toy entitled "CAPACITIVE PRESSURE SENSOR FOR A PRESSURE TRANSMITTER WHERE ELECTRIC FIELD EMANATES SUBSTANTIALLY FROM BACK SIDES OF PLATES" and in U.S. Pat. No. 6,089,097 by Roger L. Frick, Bennett L. Louwagie and Adrian C. Toy entitled "ELONGATED PRESSURE SENSOR FOR A PRESSURE TRANSMITTER." The transmitter described in these two patents uses two absolute pressure sensors to measure differential pressure as well as two absolute pressures, with high resolution on the differential pressure measurement.

One particularly advantageous form of analog-to-digital converter uses a sigma-delta modulator. The use of sigma-delta modulators in transmitters is described in U.S. Pat. No. 5,083,091 by Roger L. Frick and John P. Schulte entitled "CHARGED BALANCED FEEDBACK MEASUREMENT CIRCUIT". Other examples of the use of sigma-delta modulators in transmitters are shown in U.S. Pat. No. 6,140,952 by Michael Gaboury entitled "DELTA SIGMA CIRCUIT WITH PULSE WIDTH MODULATED OFFSET"; U.S. Pat. No. 6,509,746 by Rongtai Wang entitled "EXCITATION CIRCUIT FOR COMPENSATED CAPACITOR INDUSTRIAL PROCESS CONTROL TRANSMITTERS"; and U.S. Pat. No. 6,516,672 by Rongtai Wang entitled "SIGMA-DELTA ANALOG TO DIGITAL CONVERTER FOR CAPACITIVE PRESSURE SENSOR AND PROCESS TRANSMITTER." All of the patents mentioned above are assigned to Rosemount Inc., the assignee of the present application.

In a transmitter having a sigma-delta modulator acting as a capacitance-to-digital converter, an excitation circuit provides charge packets to the capacitive sensor elements. The sensor elements are charged by an amount based on the capacitance value of that capacitive element. The charges are transferred to an integrator/amplifier of the sigma-delta modulator to produce a one-bit binary output which is a function of a capacitance ratio.

Transmitters may communicate with a central control room in either analog or digital format. Transmitters using analog communication are often connected in a two-wire loop in which the primary process variable being sensed is transmitted to the control room by modulating the loop current between, for example, 4 and 20 milliamps. Transmitters capable of both analog and digital communication may transmit a secondary variable in digital form over the same two wire loop.

With the development of digital networks of field transmitters, the possibility of providing more than one primary variable measurement from a single transmitter becomes possible. For example, a pressure transmitter which provided digital outputs of absolute pressures as well as differential pressure would be advantageous.

BRIEF SUMMARY OF THE INVENTION

The invention is a multi-phase measurement circuit having multiple measured elements and multiple sigma-delta modulators. The measured elements include two or more sensing elements and a common or shared element (which may be either a reference element or a sensing element). Each modulator provides an output representing a ratio of one or more of the sensing elements and the shared element. The sensing elements and the shared element are connected to the sigma-delta modulators through a switching network and are driven by a common excitation circuit. Switching logic controls the switching network so that the shared element can be connected to a particular sigma-delta modulator only during the phase assigned to that modulator. As a result, the sigma-delta modulators time share the shared element.

DETAILED DESCRIPTION

Figure 1:
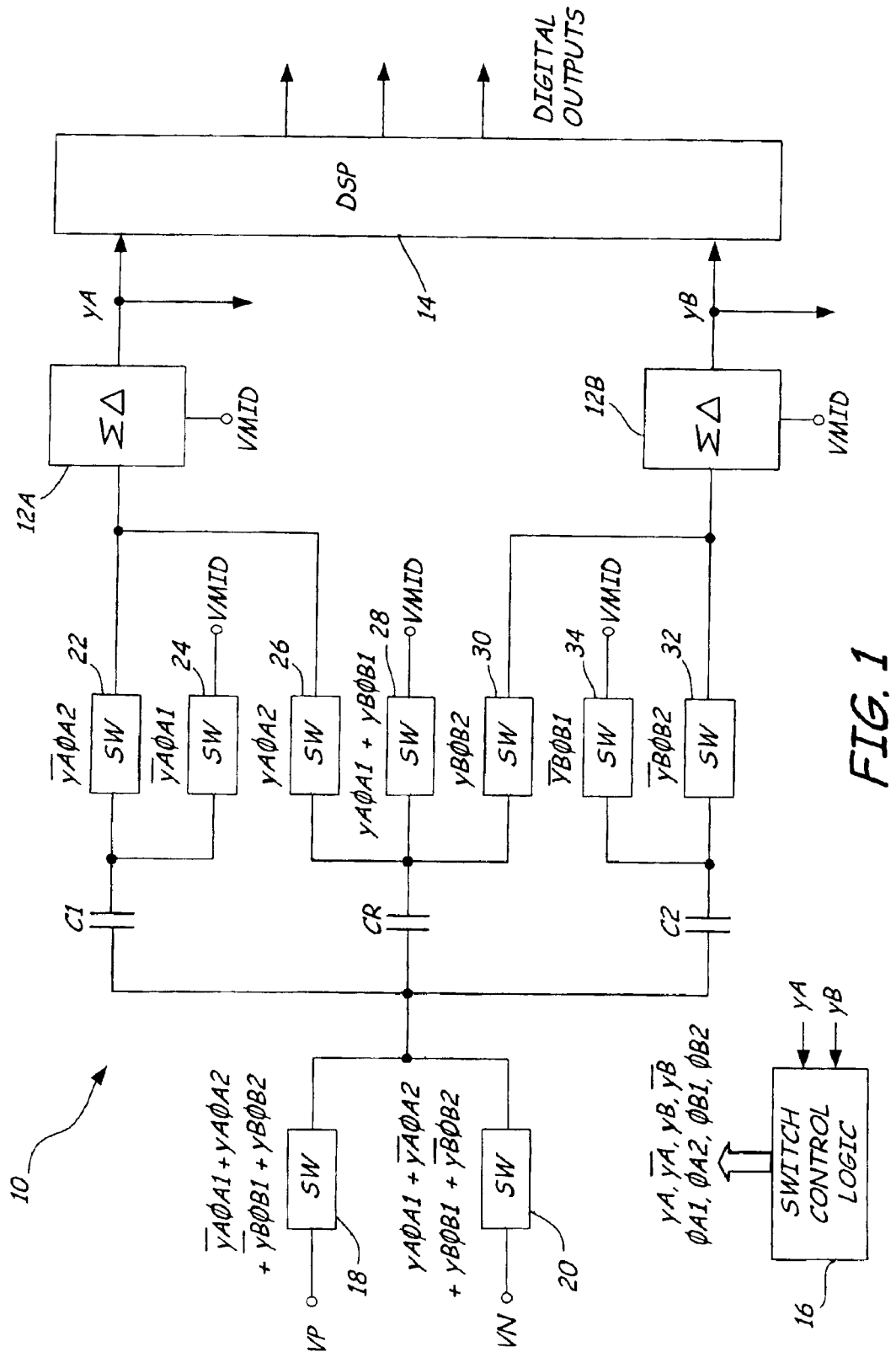
FIG. 1 is a circuit diagram for a measurement circuit having two capacitive sensing elements, a shared capacitor, and two sychronized sigma-delta modulators.

FIG. 1 is a circuit diagram of measurement circuit 10, which uses multiple sensing elements and a shared element to produce multiple digital ratio measurements. Measurement circuit 10 includes capacitance sensing element C1, capacitance sensing element C2 and shared capacitor CR, first sigma-delta modulator 12A, second sigma-delta modulator 12B, digital signal processor 14, switch control logic 16, and a switching circuit formed by switches 18, 20, 22, 24, 26, 28, 30, 32, and 34. Switches 18 and 20 are input switches, switches 22, 26, 30 and 32 are packet delivery switches, and switches 24/28 and 34 are grounding switches.

Sigma-delta modulator 12A produces an output yA, which is a one-bit digital signal representing a ratio of capacitances C1 and CR. In a preferred embodiment, sigma-delta modulators 12A and 12B are second order sigma-delta modulators. Switch control logic 16 provides switch control signals ØA1, ØA2, yA and $\overline{yA}$ which control switches 18, 20, 22, 24, 26 and 28 to control delivery of charge packets to sigma-delta modulator 12A. Negative and positive charge packets are delivered through the switches to the input of sigma-delta modulator 12A to maintain a long-term balance between positive and negative charge packets.

Sigma-delta modulator 12B produces an output yB which is a one-bit digital signal representating of a ratio of capacitances C2 and CR. Switch control logic 16 produces second phase switch control signals ØB1 and ØB2, yB and $\overline{yB}$ which control switches 18, 20, 28, 30, 32 and 34 to supply charge packets to the input of sigma-delta modulator 12B.

Digital signal processor 14 receives outputs yA and yB from sigma-delta modulators 12A and 12B and converts those signals to digital outputs representative of the parameters being measured by sensing capacitors C1 and C2. For example, if C1 and C2 are pressure sensing capacitor elements, the outputs of digital signal processor 14 may represent a first absolute pressure sensed by C1, a second absolute pressure sensed by C2 and a differential pressure representing the difference between the two absolute pressures. All three digital outputs can be derived from the two digital ratio measurements represented by yA and yB.

Measurement circuit 10 makes use of three voltage levels VP, VMID, and VN. VP is a positive voltage, VN is a negative voltage, and VMID is a voltage midway between VP and VN (and is typically ground).

The use of shared reference capacitor CR and separate sigma-delta modulators 12A and 12B allows multiple digital measurements to be provided by measurement circuit 10. To make this possible, switch control logic 16 controls the switches to define multi-phase operation in which phase A is used for charge packets being delivered to sigma-delta modulator 12A, and phase B is used to deliver charge packets to sigma-delta modulator 12B. In this way, conflicts which could result from both sigma delta modulators 12A and 12B requiring a charge packet from reference capacitor CR at the same time are eliminated.

For each sigma-delta modulator 12A, 12B, there is a defined update rate or measurement cycle which is preferably a constant. Since the circuit is digital in nature, it is a sampled data system which has a dynamic response related to the sampling frequency. If the sampling frequency (digital update frequency) is not constant the response time or frequency response of the system will not be constant. This will result in unpredictable performance in a process control loop. If the sensed elements within a sensor are sampled at different times and/or frequencies aliasing will become a problem. The average output will not correspond to the average input when the measured parameters are varying.

To achieve a constant update rate, the total number of charge packets delivered to the sigma-delta modulator 12A or 12B during a measurement cycle remains constant, although the number of positive and negative pulses during that cycle will vary based upon capacitance of the sensing element C1 or C2. This implies that the charge packet delivery rate to the sigma delta modulator is also a constant. Switch logic control 16 must decide at this constant packet delivery rate whether to deliver a positive charge representing one capacitance (or set of capacitances) or a negative charge representing another capacitance (or set of capacitances).

Shared capacitor CR can only deliver one charge packet at a time through switches 26, 28 and 30. It is not practical to split a single charge packet accurately between two competing sigma-delta modulators. If sigma-delta modulators 12A and 12B operated synchronously and exactly in phase, there would be times when both modulators 12A and 12B called for delivery of a charge packet from shared capacitor CR. There would also be times when modulators 12A and 12B would call for consecutive pulses of the same sign.

With the present invention, sigma-delta modulators 12A and 12B and the switching circuitry used to feed charge pulses to modulators 12A and 12B are operated in a synchronized multi-phase cycle of alternating phases A and B. During phase A, charge packets are delivered to sigma-delta modulator 12A from either sensor C1 or shared capacitor CR. During phase B, charge packets are delivered to sigma delta modulator 12B from either sensor C2 or shared capacitor CR. Shared capacitor CR is connected through switch 26 to the input of sigma-delta modulator 12A and through switch 30 to the input of sigma-delta modulator 12B. Switch 28 allows CR to be connected to VMID (or ground) to discharge CR between charge packet deliveries during the two phases. This allows CR to either deliver or not deliver a charge packet of the sign desired by modulators 12A and 12B on alternating phases.

In the particular embodiment shown in FIG. 1, sigma-delta modulator 12A receives negative charges from C1 and positive charges from CR. Sigma delta modulator 12B receives negative charges from C2 and positive charges from CR. During the phase A in which first sigma-delta modulator 12A is active, switch logic signals ØA1, ØA2, yA and $\overline{yA}$ control the delivery of charge packets to sigma-delta modulator 12A. When the output of sigma-delta modulator 12A is low (i.e. $\overline{yA}$ is high), switch 18 will conduct (i.e. is ON) during phase signal ØA1 and will not conduct (i.e. is OFF) during ØA2. When switch 18 conducts, positive voltage VP is applied to the input sides of C1 and CR (and also C2). The output side of C1 is connected through switch 24 to because switch 24 is ON when $\overline{yA}$ and ØA1 are high. All of the remaining switches 22, 26, 28, 30, 32, and 34 are OFF.

When $\overline{yA}$ is high, and ØA2 goes high, switch 18 is OFF while switch 20 is ON to connect voltage VN to the input side of C1, CR, and C2. With VN at the input of C1, and negative charge representative of the capacitance value of capacitor C1 is transmitted to the input of switches 22 and 24. Switch 24 is now OFF, but switch 22 is ON. As a result, switch 22 transfers the negative charge representation of capacitor C1 to the input of sigma-delta modulator 12A, where it is integrated such that the negative input produces a positive change in a signal which is being compared to VMID. When the integrated signal exceeds VMID, the output of sigma-delta modulator 12A will change state so that yA is high and yA is low. This charge integration may require a single charge packet from C1, or multiple charge packets over time in order to change yA from low to high.

After phase A is completed, phase B is then active. If the output of sigma-delta modulator 12B is low, (i.e. $\overline{yB}$ is high), a negative charge packet from C2 will be delivered to sigma-delta modulator 12B in the same fashion that a negative packet from C1 was delivered from sigma-delta modulator 12A. In other words, during ØB1 switch 18 and switch 34 will be ON, while all of the remaining switches will be OFF. During ØB2, switch 20 and switch 32 will be ON, with all of the remaining switches OFF. As a result, a negative charge packet which is a function of capacitance C2 will be supplied through switch 32 to the input of sigma-delta modulator 12B.

This pattern will continue with negative charge packets being delivered from C1 during phase A and C2 during phase B until the output of one of the two sigma-delta modulators 12A and 12B changes state. For the purpose of this example, assume that sigma-delta modulator 12A changes state, so that yA is high. During the next occurrence of phase A, switches 20 and 28 will be ON during ØA1, while all other switches are OFF. During ØA2, switch 18 and switch 26 will be ON, while all remaining switches are OFF. As a result, a positive charge packet from CR will be delivered to the input of sigma-delta modulator 12A.

Phases A and B will alternate, and at some point the output of sigma-delta modulator 12B will change state, so that yB is high. With yB high, switches 20 and 28 will be turned ON during ØB1 so that the input of CR is connected to VN, while the output is connected to VMID. All other switches are OFF during ØB1 when yB is high.

During ØB2, with yB high, switch 18 is ON connecting VP to the input of shared capacitor CR, and switch 30 is ON connecting the output of CR to the input of sigma delta modulator 12B.

The operations of sigma-delta modulators 12A and 12B are synchronized, so that both have the same measurement or update cycle. This allows digital signal processor 14 to produce digital ratios for both measurements at the same update rate, and yet the measurements do not conflict with one another in demands for shared capacitor CR.

In the preceeding description, the particular polarity of charge packets being delivered by the various capacitors was selected as an example, but other arrangements are equally applicable. For example, sigma-delta modulator 12B could receive positive pulses from C2 and negative pulses from CR during each phase B. This is accomplished simply by changing the logic states of the switch control signals required to control switches 18, 20, 28, 30, 32 and 34.

In a more complex charge balance scheme, it may be desirable to vary the sign of the charge packet delivered by shared capacitor CR depending on the demands of the integrator/logic of sigma-delta modulators 12A and 12B and switch logic 16. This can also be done by activating grounding switch 28 on either the rising or falling edge of the drive voltage supplied though switches 18 and 20 to the input of shared capacitor CR. This precharges capacitor CR to the value required to deliver the proper sign to the integrator on the next cycle. This type of operation is generally required when a sigma-delta modulator is operating in a mode where it charges from a set of capacitors that are being subtracted before integration, and the resulting sign is unknown.

Figure 2:
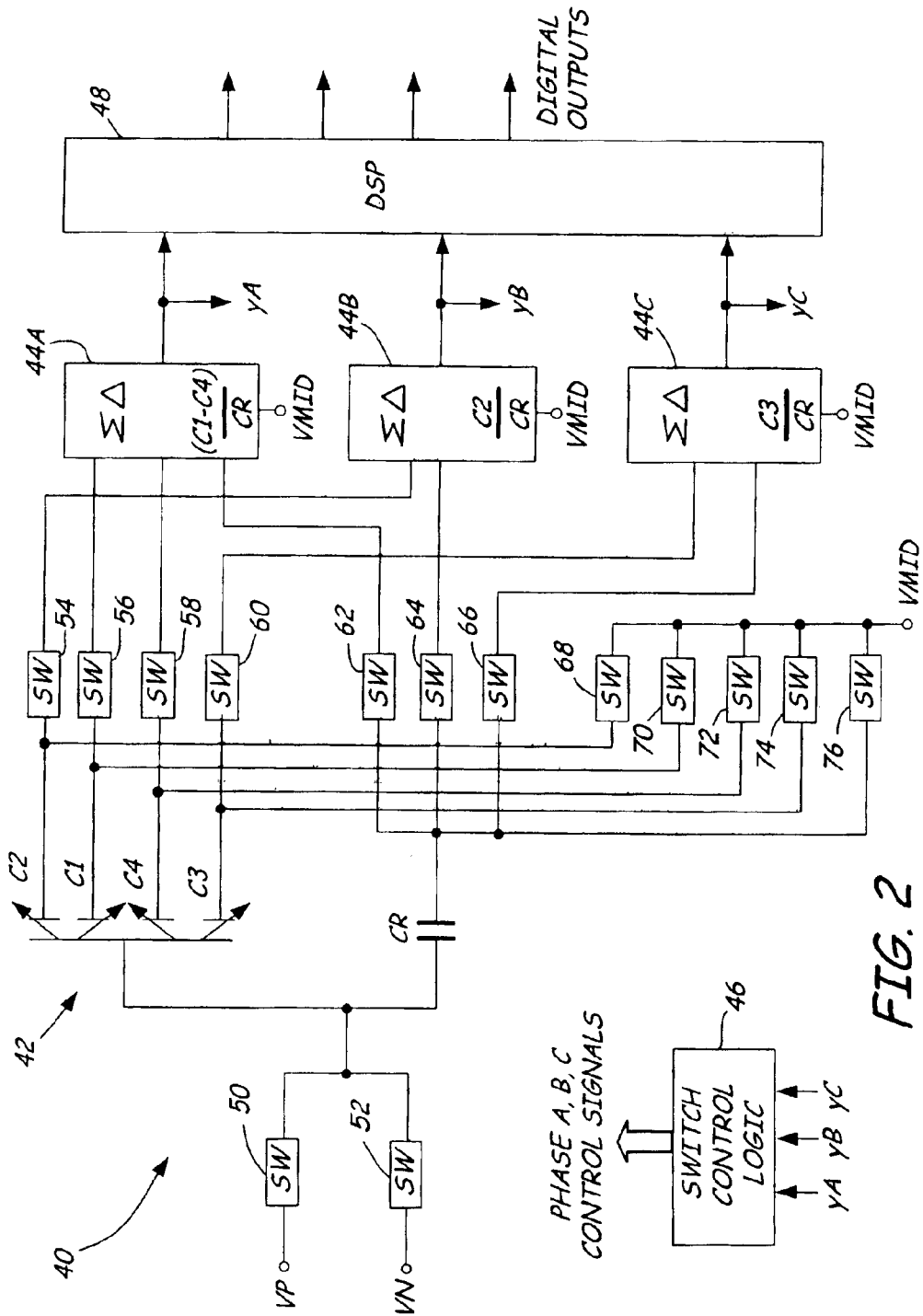
FIG. 2 is a schematic diagram of a measurement circuit for a capacitance type pressure sensor having four capacitive sensing elements, a shared capacitor, and three synchronized sigma-delta modulators.

FIG. 2 shows measurement system 40, which is a three-phase measurement system. Measurement system 40 includes capacitive pressure sensor 42 (having sensing elements C1, C2, C3, and C4), shared reference capacitor CR, sigma-delta modulators 44A, 44B, and 44C, switch control logic 46, digital signal processor 48, and a switching circuit formed by input switches 50 and 52, packet delivery switches 54, 56, 58, 60, 62, 64, and 66 and grounding switches 68, 70, 72, 74, and 76.

Capacitive sensor 42 is preferably a differential pressure sensor the type described in the Frick et al. U.S. Pat. No. 6,295,875. It has four capacitive sensing elements C1, C2, C3 and C4. At least three of these capacitive sensing elements are required in order to provide the ability to correct zero vs. line pressure errors, to measure line pressure, and to correct the differential pressure output for hysteresis type errors.

In the embodiment shown in FIG. 2, three capacitance ratios are measured. Sigma-delta modulator 44A receives charge packet inputs from capacitive sensing elements C1 and C4, and from shared capacitor CR, and produces an output representing (C1–C4)/CR.

Sigma delta modulator 44B receives charge packet inputs from sensing element C2 and shared capacitor CR. It provides an output representative of the ratio C2/CR.

Sigma delta modulator 44C receives charge packets inputs from sensing element C3 and shared capacitor CR. It produces an output representative of C3/CR.

Switch control logic 46 provides switch control signals to switches 50–76 which creates three phases: A, B, and C. The particular switches that are activated depend upon which phase is active and the output state of the modulator associated with that particular phase. As a result, the three sigma-delta modulators 44A, 44B, and 44C time share use of common reference capacitor CR. This allows each sigma-delta modulator 44A–44C to produce a ratio which is a function of CR. In turn, that allows digital signal processor 48 to produce digital output which relate the outputs of the individual sigma-delta modulators. All of the outputs are updated at the same rate, but are produced in a synchronized sequential three-phase pattern. Conflicts which would arise from use of shared capacitor CR are eliminated by the multi-phase operation of the present invention.

FIGS. 1 and 2 show two examples of the multi-phase measurement system of the present invention. The same principles can be applied to other systems having different numbers of sensing elements which are either connected together in sets (such as the set formed by capacitor C1 and C4 in FIG. 2) or individually. The number of sigma-delta modulators used can be increased depending upon the number of different ratios desired, provided that the number of phases produced by the switch control logic match the number of sigma-delta modulators that share a common reference element, such as shared capacitor CR. The common or shared element can be a reference element (such as capacitor CR in FIGS. 1 and 2), having a fixed or known value, or it can be a sensing element or unknown value.

Although the present invention has been described with reference to preferred embodiments, workers skilled in the art will recognize that changes may be made in form and detail without departing from the spirit and scope of the invention.

What is claimed is:

1. A measurement circuit comprising:
   a plurality of measured elements; and
   a plurality of sigma-delta modulators operating in a synchronized multi-phase cycle in which each sigma-delta modulator has an associated measurement phase, each sigma-delta modulator producing a digital output as a function of charge packets received from a different subset of the measured elements during its associated measurement phase, each different subset including one of the measured elements that is shared by the subsets.

2. The measurement circuit of claim 1 and further comprising:
   a switching circuit having a plurality of switches for delivering charge packets as functions of the measured elements to the plurality of sigma-delta modulators; and switch logic control for controlling the switching circuit as a function of the measurement phase and the digital output of the sigma-delta modulator associated with that measurement phase.

3. The measurement circuit of claim 2 wherein the switching circuit comprises:

input switches for selectively connecting the measured elements to positive and negative voltages;

charge packet delivery switches for selectively connecting the measured elements to the sigma-delta modulators; and grounding switches for selectively connecting the measured elements to a ground potential.

4. The measurement circuit of claim 1 wherein the measured elements include capacitive sensor elements.

5. The measurement circuit of claim 4 wherein the measured element that is shared is a reference capacitor.

6. A measurement circuit comprising:

a first measured element;

a second measured element;

a third measured element;

a first charge packet integrating converter for producing first output as a function of a ratio of charge packets received;

a second charge packet integrating converter for producing a second output as a function of a ratio of charge packets received;

a drive signal source for providing drive signals to the first, second and third measured elements;

a switching circuit for selectively supplying charge packets from the first measured element and the third measured element to the first charge packet integrating converter and for selectively supplying charge packets from the second measured element and the third measured element to the second charge packet integrating converter; and switch control logic for controlling the switching circuit so that the first charge packet integrating converter receives charge packets during a first phase and the second charge packet integrating converter receives charge packets during a second phase.

7. The measurement circuit of claim 6 wherein the first and second charge packet integrating converters comprise sigma-delta modulators.

8. The measurement circuit of claim 7 wherein the sigma-delta modulators are second order sigma-delta modulators.

9. The measurement circuit of claim 6 wherein the switch control logic controls the switching circuit as a function of the first output during the first phase and as a function of the second output during the second phase.

10. The measurement circuit of claim 6 wherein the switching circuit comprises:

charge packet delivery switches for controlling delivery of charge packets to the converters; and grounding switches for selectively connecting the first, second and third measured elements to a ground potential.

11. The measurement circuit of claim 6 wherein the first and second measured elements are capacitive sensor elements.

12. The measurement circuit of claim 6 wherein the first and second measured elements are absolute pressure sensors.

13. The measurement circuit of claim 6 wherein the third measured element is a capacitor.

14. The measurement circuit of claim 6 and further comprising:

a digital signal processor for producing a plurality of digital outputs as a function of the first and second outputs.

15. The measurement circuit of claim 6 wherein the third measured element has a fixed value.

16. The measurement circuit of claim 6 wherein the third measured element has a variable value.

17. A measurement circuit comprising:

a plurality of sensor elements;

a shared element; and a plurality of sigma-delta modulators operating in a synchronized multi-phase cycle in which each sigma-delta modulator has an associated measurement phase, each sigma-delta modulator producing a digital output as a function of charge packets received from at least one of the sensor elements and the shared element during its associated measurement phase.

18. The measurement circuit 17 and further comprising:

a switch circuit having a plurality of switches for delivering charge packets as functions of the sensor elements and the shared element to the plurality of sigma-delta modulators; and switch logic control for controlling the switching circuit as a function of the measurement phase and the digital output of the sigma-delta modulator associated with that measurement phase.

19. The measurement circuit of claim 18 wherein the switching circuit comprises:

input switches for selectively connecting the sensor elements and the reference element to positive and negative voltages;

charge packet delivery switches for selectively connecting the sensor elements and the shared element to the sigma-delta modulators; and grounding switches for selectively connecting the sensor elements and the reference element to a ground potential.

20. The measurement circuit of claim 17 wherein the sensor elements are capacitive sensor elements.

21. The measurement circuit of claim 20 wherein the shared element is a reference capacitor.

22. The measurement circuit of claim 17 wherein the shared element is a sensor having a variable value.

23. The measurement circuit of claim 17 wherein the shared element is a reference element having a fixed value.

24. A measurement circuit comprising:

a first sensor element;

a second sensor element;

a first charge packet integrating converter for producing first output as a function of a rate of packets received;

a second charge packet integrating converter for producing a second output as a function of a ratio of packets received;

a shared element;

a drive signal source for providing drive signals to the first and second sensor elements and the shared element;

a switching circuit for selectively supplying charge packets from the first sensor element and the shared element to the first charge packet integrating converter and for selectively supplying charge packets from the second sensor element and the shared element to the second charge packet integrating converter; and switch control logic for controlling the switching circuit so that the first charge packet integrating converter receives charge packets during a first phase and the second charge packet integrating converter receives charge packets during a second phase.

25. The measurement circuit of claim 24 wherein the first and second charge packet integrating converters comprise sigma-delta modulators.

26. The measurement circuit of claim 25 wherein the sigma-delta modulators are second order sigma-delta modulators.

27. The measurement circuit of claim 24 wherein the switch control logic controls the switching circuit as a function of the first output during the first phase and as a function of the second output during the second phase.

28. The measurement circuit of claim 24 wherein the switching circuit comprises:

charge packet delivery switches for controlling delivery of packets to the converters; and grounding switches for selectively connecting the first and second sensor elements and the shared element to a ground potential.

29. The measurement circuit of claim 24 wherein the first and second sensor elements are capacitive sensor elements.

30. The measurement of claim 24 wherein the first and second sensor elements are absolute pressure sensors.

31. The measurement circuit of claim 24 wherein the shared element is a capacitor.

32. The measurement circuit of claim 24 and further comprising:

a digital signal processor for producing a plurality of digital outputs as a function of the first and second outputs.

33. The measurement circuit of claim 24 wherein the shared element has fixed value.

34. The measurement circuit of claim 24 wherein the shared element has a variable value.

* * * * *